United States Patent [19]

Kodera

[11] 4,311,404
[45] Jan. 19, 1982

[54] SPRINKLER BRUSH ASSEMBLY

[76] Inventor: Masao Kodera, 13-2, Mishi-Uratate, Sanjo-shi, Niigata-ken, Japan

[21] Appl. No.: 105,380

[22] Filed: Dec. 19, 1979

Related U.S. Application Data

[63] Continuation of Ser. No. 881,526, Feb. 27, 1978, abandoned.

[30] Foreign Application Priority Data

Jul. 7, 1977 [JP] Japan .................................. 52-90335
Dec. 6, 1977 [JP] Japan .................................. 52-163615

[51] Int. Cl.³ ............................. A46B 11/06; B05B 1/06
[52] U.S. Cl. ............................. 401/287; 239/288.5; 239/499; 401/289
[58] Field of Search .................. 401/290, 291, 286, 287, 401/288; 239/600, 499, 288.5

[56] References Cited

U.S. PATENT DOCUMENTS

| | | | |
|---|---|---|---|
| 663,245 | 12/1900 | Sturgis | 401/286 |
| 1,080,562 | 12/1913 | Kells | 239/499 |
| 1,188,262 | 6/1916 | Frederick | 401/288 |
| 1,476,971 | 12/1923 | Hurd | 239/600 |
| 1,597,477 | 8/1926 | Panhorst | 239/600 |
| 1,718,117 | 6/1929 | Dainos | 401/291 |
| 1,723,684 | 8/1929 | Dowd | 401/291 |
| 2,275,350 | 3/1942 | Cords | 401/286 |
| 2,528,599 | 11/1950 | Loether | 401/290 |
| 2,601,893 | 7/1952 | Funke | 239/499 |
| 3,267,903 | 8/1966 | Valentine | 119/83 |
| 3,378,331 | 4/1968 | Beasley | 401/286 |
| 4,126,401 | 11/1978 | Stoyshin | 401/289 |

FOREIGN PATENT DOCUMENTS

| | | | |
|---|---|---|---|
| 525976 | 7/1956 | Belgium | 239/499 |
| 592629 | 2/1960 | Canada | 401/286 |
| 752288 | 10/1933 | France | 401/291 |
| 1244738 | 9/1960 | France | 401/288 |
| 1355299 | 2/1964 | France | 401/291 |
| 1441642 | 5/1966 | France | 239/499 |
| 938358 | 10/1963 | United Kingdom | 401/291 |

*Primary Examiner*—Clyde I. Coughenour
*Attorney, Agent, or Firm*—Mawhinney, Mawhinney & Connors

[57] ABSTRACT

A hollow tubular handle is connected at one end to a pressurized water supply and carries a sprinkler head at its other end. A brush attached to the sprinkler head is formed with a hole through which water from sprinkler head passes without contact with the brush. A tubular member extends from the sprinkler head partially through the hole in the brush to prevent the bristles of the brush from being bent into the flow from the sprinkler head when the brush is pressed against a surface to be washed such as an automobile body.

1 Claim, 8 Drawing Figures

SPRINKLER BRUSH ASSEMBLY

This is a continuation of application Ser. No. 881,526 filed Feb. 27, 1978 now abandoned.

BACKGROUND OF THE INVENTION

The present invention relates to a sprinkler brush assembly for washing automotive vehicles, walls and floors of bathrooms and the like and which may also be used as a garden sprinkler.

Prior to the invention of the conventional car washing brush, automobile owners would generally wash their vehicles by applying water from a hose and simultaneously rubbing the car body with a brush or sponge. This operation requires that the hose be held in one hand and the brush in the other, rendering car washing awkward and unpleasant. As an alternative, the brush may be repeatedly dipped into a bucket of water.

The conventional car washing brush was invented to improve the situation and comprises a hollow handle which is attached at its end to a pressurized water supply such as a municipal water faucet. A number of bristles extend from the handle to form a brush. A number of holes are formed through the handle between the roots of the bristles through which the water sprays out of the handle into the brush.

The conventional car washing brush greatly facilitates the car washing operation since it may be held in one hand and is automatically supplied with water while being rubbed over the automobile body.

However, this prior art brush suffers from several disadvantages, the most obvious being that it cannot be used as a garden sprinkler. This is because the water issuing from the holes collides with the brush bristles, making it impossible for the brush to discharge a water jet.

The prior art car washing brush, even though especially designed for washing automotive vehicles, is inefficient for this purpose. Although it will remove large particles of mud, sand, dust and the like by brushing action, the relatively small and few water discharge holes in combination with the interference of the bristles to the water flow make it impossible for the brush to remove tiny dirt particles which cling to the car body under the force of surface tension. To achieve thorough cleaning, it is necessary to perform the additional step of rinsing the car body with a high pressure water hose after rubbing with the brush, since a high impact force is necessary for the water to blast away the small particles.

SUMMARY OF THE INVENTION

The present invention overcomes the drawbacks of the prior art by providing a brush assembly which comprises a hollow tubular handle which is connected at one end to a pressurized water source and carries a sprinkler head at its other end. A brush attached to the sprinkler head is formed with a hole through which water from the sprinkler head passes without contact with the brush bristles. A tubular member extends from the sprinkler head partially through the hole in the brush to prevent the bristles of the brush from being bent into the flow from the sprinkler head when the brush is pressed against a surface to be washed. The unimpeded flow from the sprinkler, when the brush is pressed against a surface, constitutes a relatively narrow spray which impinges against the surface with high force. The spray diverges when the brush is moved away from an object to form a wider and more gentle spray which is ideal for watering a garden. The brush may be used for washing walls and floors in addition to automobile bodies.

It is an object of the present invention to provide a sprinkler brush assembly which may be advantageously used to wash automotive vehicle bodies, walls, floors and the like and may also be used as a garden sprinkler without alteration.

It is another object of the present invention to provide a sprinkler brush assembly which discharges a strong water jet against an object when the brush is in contact with the object, thereby greatly improving the washing efficiency over the prior art.

It is another object of the present invention to provide a sprinkler brush assembly comprising means for preventing bristles of the brush from interfering with the water flow when the brush is pressed against a surface and the bristles bent inwardly.

It is another object of the present invention to provide a generally improved sprinkler brush assembly.

Other objects, together with the foregoing, are attained in the embodiments described in the following description and illustrated in the accompanying drawing.

DESCRIPTION OF THE PREFERRED EMBODIMENTS

While the sprinkler brush assembly of the invention is susceptible of numerous physical embodiments, depending upon the environment and requirements of use, substantial numbers of the herein shown and described embodiments have been made, tested and used, and all have performed in an eminently satisfactory manner.

Figure 1:
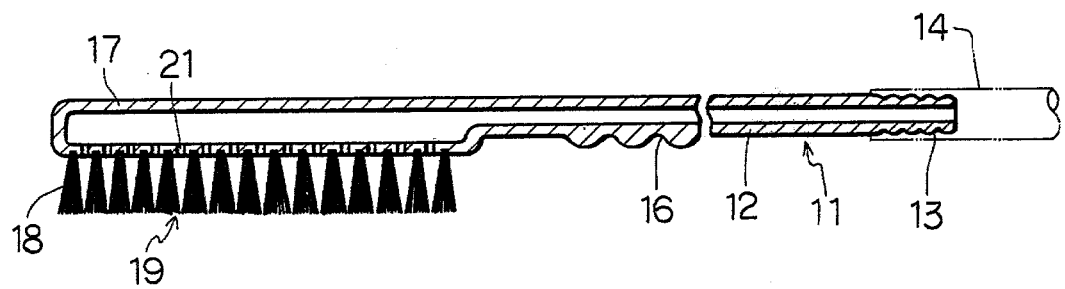
FIG. 1 is a longitudinal sectional view of a prior art car washing brush.

Referring now to FIG. 1 of the drawing, a prior art car washing brush is generally designated by the reference numeral 11 and comprises a hollow handle 12. A serrated annular connector 13 is formed at the end of the handle 12 for connection of the brush assembly 11 to a municipal water faucet (not shown) through a hose 14. The connector 13 is designed to prevent the end of the hose 14 from slipping off the handle 12. A grip 16 is formed at an intermediate portion of the handle 12.

Designated as 17 is a generally rectangular portion of the handle 12 from which extends a plurality of bristles 18 to constitute a brush 19, only one cluster of bristles 18 being labeled to prevent cluttering of the drawing. A number of holes 21 are formed through the rectangular portion 17 between the bristles 18. Water flowing through the handle 12 from the hose 14 is discharged through the holes 21 into the brush 19. The brush 11 is disadvantageous as discussed above since it cannot form a strong spray or jet due to the small number and size of the holes 21 and the fact that the spray from the holes 21 is blocked by the bristles 18.

Figure 2:
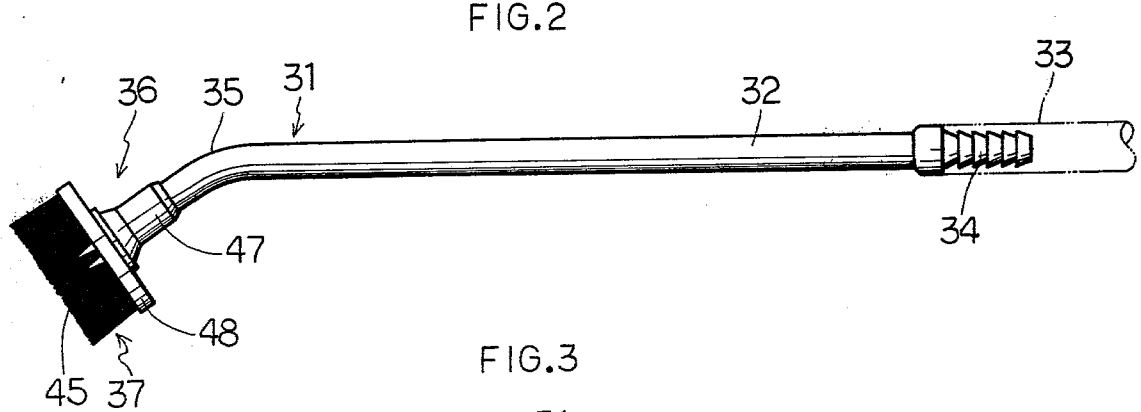
FIG. 2 is an elevational view of a sprinkler brush assembly embodying the present invention.
Figure 3:
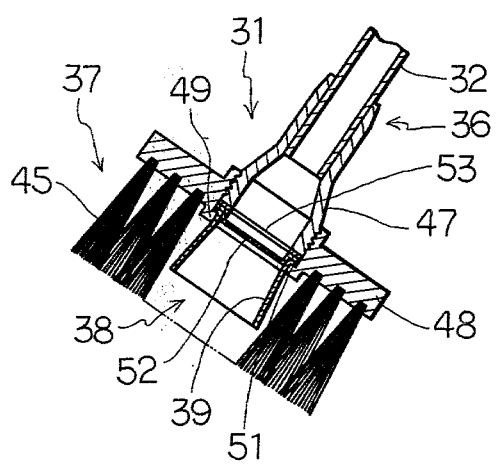
FIG. 3 is a fragmentary longitudinal sectional view of the sprinkler brush assembly shown in FIG. 2.

FIGS. 2 and 3 illustrate a sprinkler brush assembly embodying the present invention which completely overcomes these drawbacks and is designated as 31. The assembly 31 comprises an elongated, hollow tubular handle 32 which is connected at one end to a water hose 33 by means of an annularly serrated connector 34. A sprinkler head 36 is provided at the other end of the handle 32. To facilitate washing, the handle 32 may be bent as indicated at 35.

Attached to the sprinkler head 36 is a brush 37 which is formed with a central hole 38 concentric with the sprinkler head 36. A diverter tube 39 which preferably has a diverging cross section extends axially from the sprinkler head 36 in concentricity therewith partially through the hole 38.

The hole 38 is designed to be sufficiently larger in diameter than the sprinkler head 36 so that water discharged from the sprinkler head 36 passes through the hole 38 without touching the brush 37.

Figure 4:
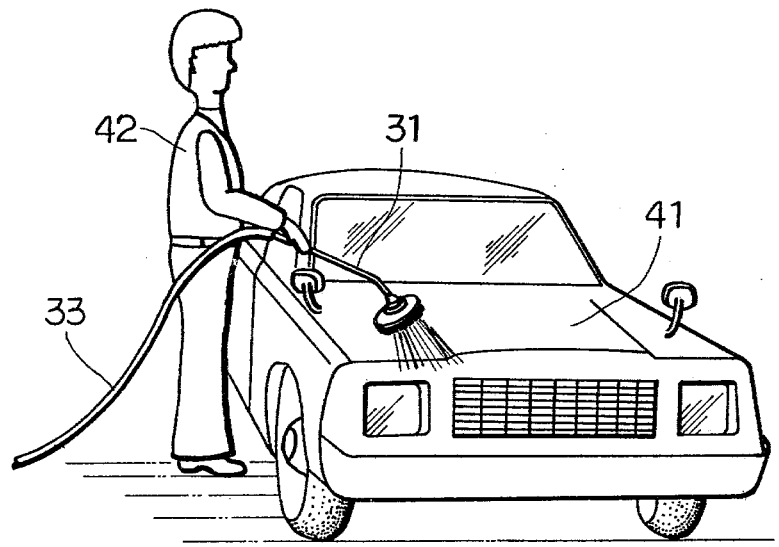
FIG. 4 is a diagrammatic perspective view illustrating the present sprinkler brush assembly being used to wash an automobile.

FIG. 4 shows the present sprinkler brush assembly 31 being used by a car owner 42 to wash his automobile 41. The assembly 31 is held in one hand with the brush 37 pressed against the body of the automobile 41. The brush 37 is rubbed over the body of the automobile 41 to dislodge particles of mud, dust, etc.

The sprinkler head 36 discharges a spray of water at high force against the body of the automobile 41 to soakingly loosen the dirt thereon and also carry away the dirt dislodged by the brush 37. Since the spray from the sprinkler head 36 is not obstructed by the brush 37, it impinges against the body of the automobile 41 with high force to dislodge small dirt particles which cling thereto under surface tension. Since the sprinkler head 36 is very close to the body of the automobile 41, the spray therefrom is narrow and strong.

The diverter tube 39 is provided to ensure that the bristles of the brush 37 will not be bent into the path of the spray when the brush 37 is pressed against the body of the automobile 41. Any bristles which are pressed inwardly toward the hole 38 abut against the diverter tube 39 and are prevented from entering the hole 38.

Where soap is used to wash the automobile 41, the water pressure is reduced for rubbing the automobile 41 with the brush 37 and applying the soap and subsequently increased to wash away the soap and dirt.

If the diverter tube 39 had the same axial length as the bristles of the brush 37, it would prevent the brush 37 from effectively engaging the body of the automobile 41 and would also scratch the body. For this reason, the axial length of the diverter tube 39 is selected to be between ⅓ and ½ the length of the bristles of the brush 37. The diverter tube 39 of this length is long enough to prevent the bristles of the brush 37 from being bent into the path of the spray from the sprinkler head 36 but not long enough to engage with and scratch the surface of the automobile 41 when the brush 37 is operatively pressed thereagainst.

Figure 5:
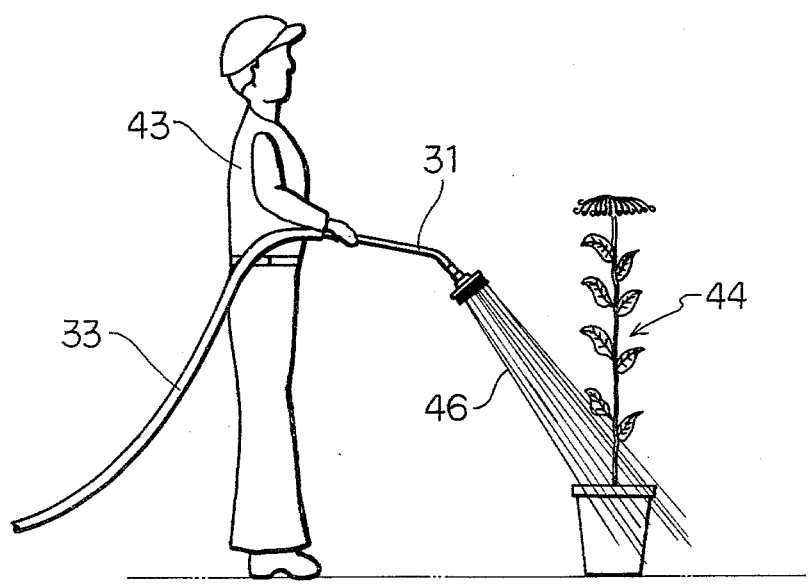
FIG. 5 is a diagrammatic perspective view illustrating the present sprinkler brush assembly being used as a sprinkler to water a potted plant.

FIG. 5 shows a gardner 43 using the present sprinkler brush assembly 31 to water a potted plant 44. With the assembly 31 spaced at a distance from the plant 44, the spray from the sprinkler head 36, indicated at 46, diverges such as to be ideal for sprinkling or watering plants. The farther the sprinkler head 36 from the plant 44, the wider and more gentle the spray 46. Since the spray 46 is unimpeded by the brush 37, the gardener 43 may advantageously adjust the diameter and intensity of the spray 46 by merely moving toward or away from the plant 44 and adjusting the water pressure applied to the hose 33.

As best seen in FIG. 3 the sprinkler head 36 comprises a diverging nozzle 47 which is fixed to the illustrated end of the handle 32. External threads are formed on the end portion of the nozzle 47, although not designated by a reference numeral.

The brush 37 comprises an annular plate 48 which is formed with internal threads conjugate to the nozzle 47 and a plurality of bristles 45 extending axially away from the nozzle 47. The bristles 45 are omitted in the area of the hole 38. The plate 48 is formed with an inwardly extending flange 49 and the diverter cone 39 is formed with an outwardly extending flange 51.

The sprinkler head 36 further comprises a sprinkler disc 52 formed with a plurality of holes which are not visible in the drawing and an O-ring seal 53. To assemble the sprinkler brush assembly 31, the diverter tube 39 is pressed through the opening (not designated) in the plate 48 to the illustrated position in which the flanges 49 and 51 abut. The tube 39 is formed of a resilient synthetic plastic or rubber material allowing radial compressive deformation thereof for assembly. Then, the sprinkler disc 52 and O-ring 53 are placed onto the flange 51 and the plate 48 is screwed tightly onto the nozzle 47. The O-ring 53, sprinkler disc 52 and diverter tube 39 are rigidly held in place between the end of the nozzle 47 and the flange 49.

Figure 6:
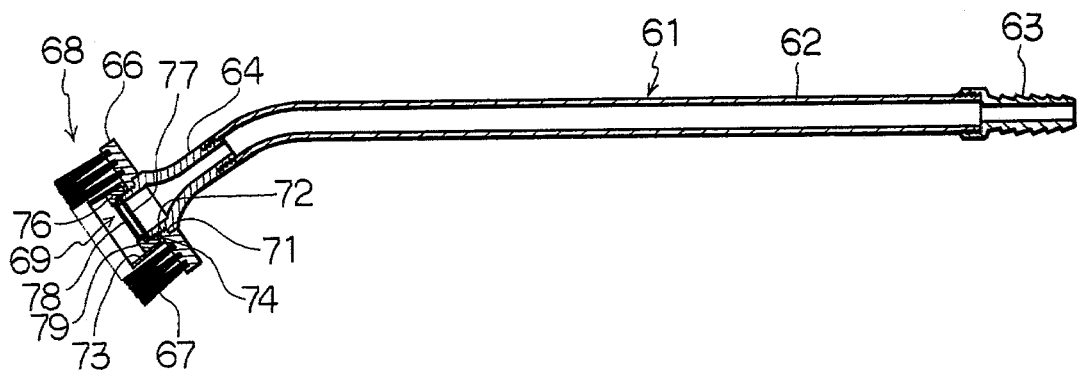
FIG. 6 is a longitudinal sectional view of another sprinkler brush assembly embodying the present invention.

FIG. 6 illustrates another sprinkler brush assembly 61 embodying the present invention which comprises a hollow handle 62 provided with a connector 63 at one end and a nozzle 64 at the other end thereof. The assembly 61 is similar to the assembly 31 except for the means used to clamp the various components together, as will be described in detail.

The assembly 61 comprises an annular plate 66 from which extend bristles 67 to form a brush 68 formed with a central hole 69. The end portion of the nozzle 64 is externally threaded. An outwardly extending flange 71 is formed on the nozzle 64 at the inner end of the threads.

The hole (not designated) through the plate 66 is not threaded. However, an inwardly extending flange 72 adapted to abut against the flange 71 is provided to the plate 66 at the axially outer end portion thereof. A diverter tube 73 is formed with an inwardly extending flange 74 adapted to abut against the flange 71. A clamp nut 76 is formed with internal threads conjugate to the threads of the nozzle 64.

To assemble the assembly 61, the plate 66 and tube 73 are slipped onto the nozzle 64. Then, an O-ring 77 and a perforated sprinkler disc 78 having diameters slightly smaller than the nozzle 64 are placed onto the end of the nozzle 64. Finally, the clamp nut 76 is tightly screwed onto the nozzle 64. An inwardly extending flange 79 is formed on the axially outer end of the clamp nut 76 to firmly hold the O-ring 77 and sprinkler disc 78 against the end of the nozzle 64.

Figure 7:
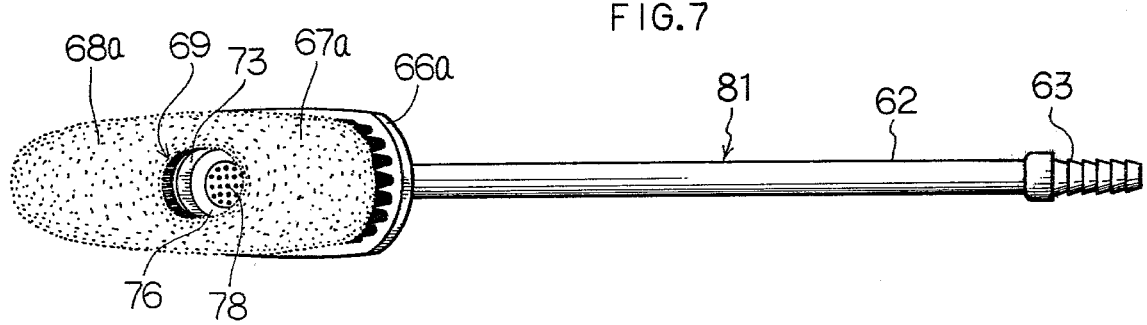
FIGS. 7 and 8 are perspective views illustrating alternative shapes of brushes of the present sprinkler brush assembly.
Figure 8:
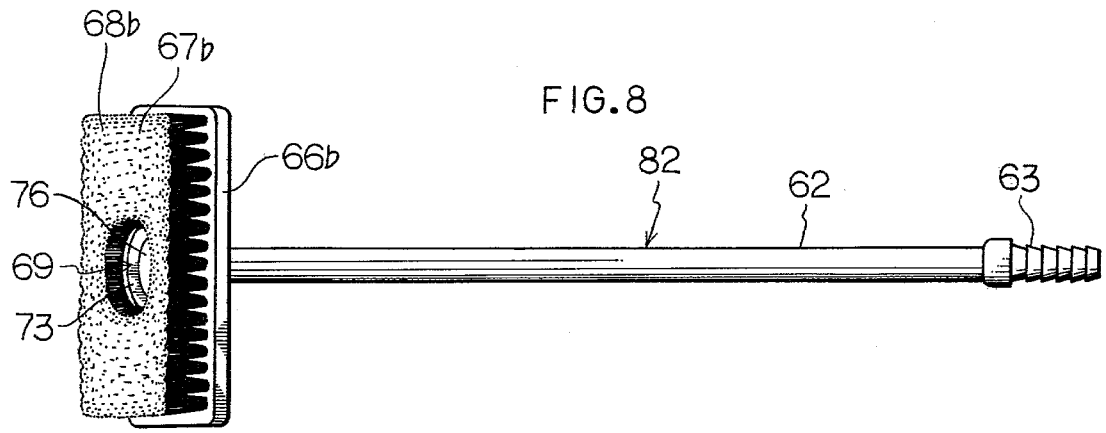

FIGS. 7 and 8 illustrate modified sprinkler brush assemblies which are identical to the assembly 61 except for the shape of the brush. Like elements are designated by the same reference numerals and modified elements are designated by the same reference numerals suffixed with the letters a and b respectively. The elliptical brush 68a of FIG. 7 is ideal for cleaning walls and the rectangular brush 68b is especially suited for cleaning floors.

In the assemblies 81 and 82 it is preferable to provide a conjugate rectangular key and keyway to the nozzle 64 and plate 66a or 66b respectively to assure the desired rotational relationship therebetween, although not illustrated. In the assemblies 31 and 61, the rotational relationship between the handles and brushes is irrelevant since the brushes are round.

In summary, it will be seen that the present invention provides a greatly improved sprinkler brush assembly which is effective not only for cleaning automobiles, floors, walls and the like but for use as a garden sprinkler without alteration. Various modifications will become possible for those skilled in the art after receiving the teachings of the present disclosure without departing from the scope thereof.

What is claimed is:
1. A brush assembly comprising, in combination:
   a hollow handle having an end portion which is threaded, said end portion comprising a sprinkler head formed with a nozzle having an outwardly extending flange;
   an annular plate connected to said nozzle and being formed with a hole therethrough which is concentric with and larger in diameter than said end portion, and being formed with an inwardly extending flange which is sealingly engaged with the flange of the nozzle;
   a sprinkler disc carried by said end portion;
   sealing means between said nozzle end portion and disc;
   a grouping of bristles extending from the plate axially away from the handle;
   a resilient diverter tube extending concentrically from said nozzle in alignment with the nozzle and located centrally witin the group of bristles, said tube being formed with a flange at an axially inner end thereof, the axial length of the tube being between $\frac{1}{8}$ and $\frac{1}{2}$ of the length of the bristles so as to thereby prevent the bristles from being bent inwardly toward the hole of the plate, whereby the bristles when pressed against a hard surface cannot bend inwardly to the point of closing off the hole; and,
   clamp means for sealingly clamping the flange of the tube to the annular plate and said nozzle, said clamp means including a nut formed with threads conjugate to said nozzle.

* * * * *